United States Patent
Kumagai

(10) Patent No.: US 9,824,089 B2
(45) Date of Patent: Nov. 21, 2017

(54) COMMUNICATION APPARATUS, DATA CONTROL METHOD IN SAID APPARATUS, AND STORAGE MEDIUM STORING PROGRAM FOR DATA CONTROL

(75) Inventor: Takekazu Kumagai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 554 days.

(21) Appl. No.: 13/444,241

(22) Filed: Apr. 11, 2012

(65) Prior Publication Data

US 2012/0290734 A1 Nov. 15, 2012

(30) Foreign Application Priority Data

May 13, 2011 (JP) ................................ 2011-108735

(51) Int. Cl.
*H04L 29/06* (2006.01)
*G06F 17/30* (2006.01)
*H04L 29/12* (2006.01)

(52) U.S. Cl.
CPC .... *G06F 17/30091* (2013.01); *H04L 61/1594* (2013.01)

(58) Field of Classification Search
CPC ............... H04L 61/304; H04L 61/1594; G06F 17/30091
See application file for complete search history.

(56) References Cited

U.S. PATENT DOCUMENTS

| | | | |
|---|---|---|---|
| 2006/0253610 A1* | 11/2006 | Yamada | H04L 67/16 709/245 |
| 2007/0192335 A1* | 8/2007 | Sugiura | G06F 17/30725 |
| 2009/0113010 A1* | 4/2009 | Kobayashi et al. | 709/206 |
| 2011/0023054 A1* | 1/2011 | Yamazaki | G06F 3/1204 719/321 |

FOREIGN PATENT DOCUMENTS

JP 2006-157922 A 6/2006

\* cited by examiner

*Primary Examiner* — Vivek Srivastava
*Assistant Examiner* — Hien Doan
(74) *Attorney, Agent, or Firm* — Carter, DeLuca, Farrell & Schmidt, LLP

(57) ABSTRACT

A list of addresses indicating communication destinations is acquired. A communication protocol used between a communication apparatus and a communication destination indicated by an address is specified. The notation of the address included in the list is converted.

11 Claims, 6 Drawing Sheets

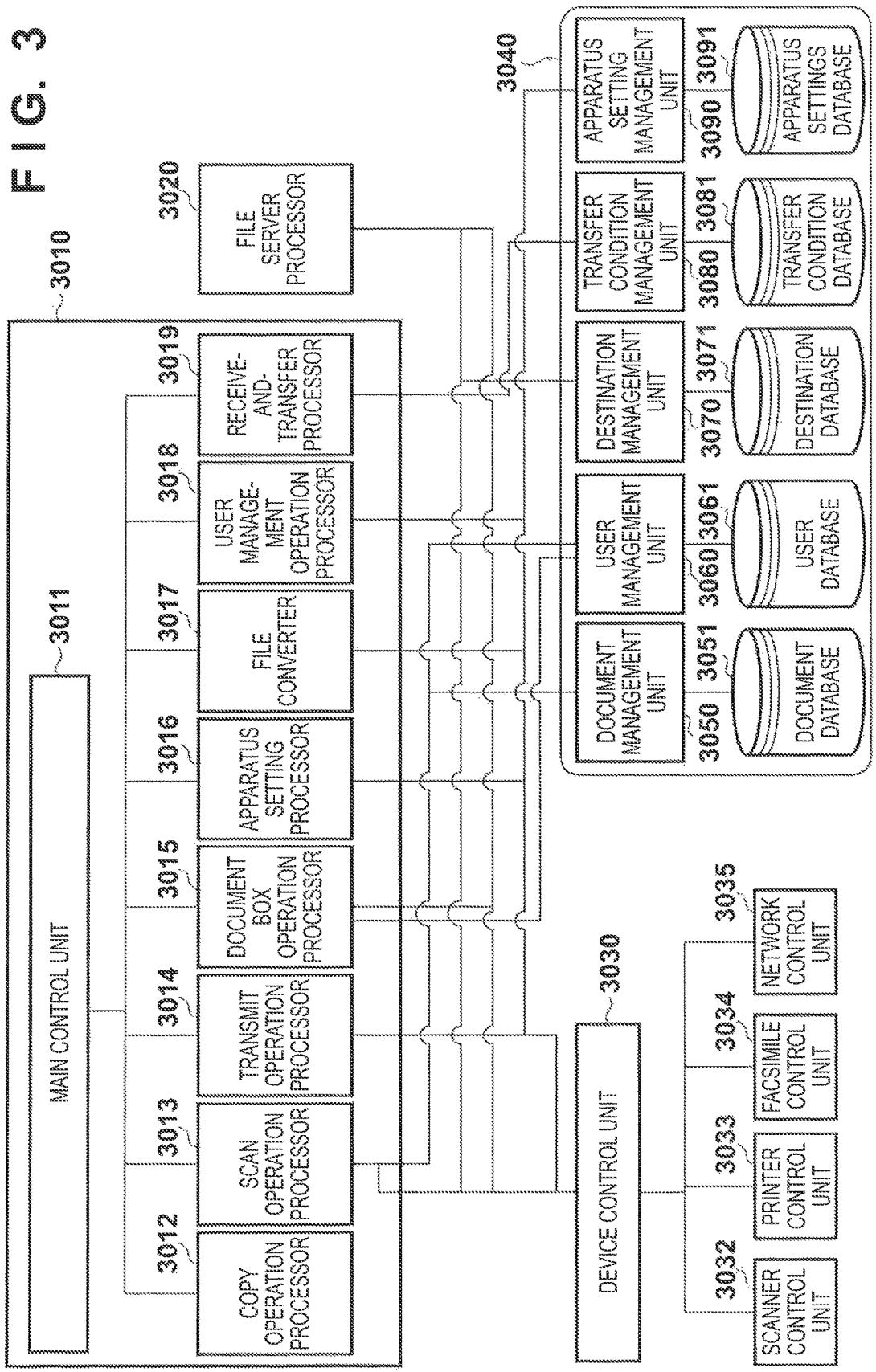

COMMUNICATION APPARATUS, DATA CONTROL METHOD IN SAID APPARATUS, AND STORAGE MEDIUM STORING PROGRAM FOR DATA CONTROL

BACKGROUND OF THE INVENTION

Field of the Invention

The present invention relates to a communication apparatus for importing/exporting an address list, a method of controlling data in the communication apparatus, and a storage medium storing a program for implementing the method.

Description of the Related Art

A receive-and-transfer function known in the art transfers a facsimile document, which has been received by a communication apparatus such as a multifunction peripheral, to a file server on a network. When this function is applied to cooperate with a file server function possessed by the communication apparatus, transfer to one's own apparatus may be achieved. In addition, a transfer setting may be performed in another communication apparatus on the network by a distribution function and by an export or import function.

An external controller such as a printer server is available as an apparatus used upon being connected between a document management apparatus and a network. If such an external controller is connected to a communication apparatus, the protocol capable of being used as the file server of the communication apparatus becomes restricted to a specific protocol. For example, an SMB/CIFS protocol is a complicated protocol that employs multiple ports. When an external controller is used, therefore, the file server function can no longer be used in the communication apparatus owing to the SMB/CIFS protocol.

Protocols for implementing a file server function include the WebDAV protocol in addition to the SMB/CIFS protocol. The WebDAV protocol is an extension of the http protocol and allows transfer processing to be executed comparatively easily since only one network port can be used and because the URL of the destination to be accessed is designated, etc. This means that even if an external controller has been connected to a communication apparatus, the file server function of the communication apparatus can be used by transferring a request, which is for having the communication apparatus execute WebDAV processing, from the external controller to the communication apparatus. In this case, a special port number is appended to an address for the purpose of utilising the file server function of the communication apparatus.

When the file server function of a communication apparatus is made available over a network, therefore, there is a case where the function is published using the SMB/CIFS protocol and a case where the function is published using the WebDAV protocol. If the function is published, using the WebDAV protocol, then there are a further two cases, one in which a special port number is appended and one in which the special port number is not appended. Thus, a total of three states of availability are conceivable.

A technique relating to import of an address book is described in the specification of Japanese Patent Laid-Open No. 2006-157922. According to Japanese Patent Laid-Open No. 2006-157922, a common address book of the LDAP protocol is shared by multiple communication terminals, the address of each communication terminal is converted to information suited to a common address of the LDAP protocol, and the information is registered in the LDAP common address book.

However, in a case where export or import of a transfer setting is performed between apparatuses in which there is a discrepancy in terms of the state in which the file server function is published, as mentioned above, the expression of the address for accessing the file server of one's own apparatus will differ. Accordingly, there is the danger that operation will not be as intended by the user.

SUMMARY OF THE INVENTION

An aspect of the present invention is to eliminate the above-mentioned problems with the conventional technology.

The present invention provides a communication apparatus in which address mismatch between the apparatus and another communication apparatus is prevented, a method of controlling data in a communication apparatus, and a computer-readable storage medium storing a program for implementing this method.

The present invention in its first aspect provides a communication apparatus comprising: an acquisition unit configured to acquire a list of addresses indicating communication destinations; a specifying unit configured to specify a communication protocol used between the communication destination and the communication apparatus; and a converting unit configured to convert notation of the address included in the list in accordance with the communication protocol specified by the specifying unit.

The present invention in its second aspect provides a data control method executed in a communication apparatus capable of communicating with another communication apparatus via a network, comprising: an acquisition step of acquiring a list of addresses indicating communication destinations; a specifying seep of specifying a communication protocol used between the communication apparatus and the other communication apparatus; and a converting step of converting notation of the address included in the list in accordance with the communication protocol specified at the specifying step.

The present invention in its third aspect provides a computer-readable storage medium storing a program for causing a computer to execute: an acquisition step of acquiring a list of addresses indicating communication destinations; a specifying step of specifying a communication protocol used with another communication apparatus capable of communicating via a network; and a converting step of converting notation of the address included in the list in accordance with the communication protocol specified at the specifying step.

In accordance with the present invention, address mismatch between apparatuses can be prevented.

Further features of the present invention will become apparent from the following description of exemplary embodiments with reference to the attached drawings.

BRIEF DESCRIPTION OF THE DRAWINGS

FIG. 3 is a diagram illustrating the main components of the software configuration of a communication apparatus;

DESCRIPTION OF THE EMBODIMENTS

Figure 1:
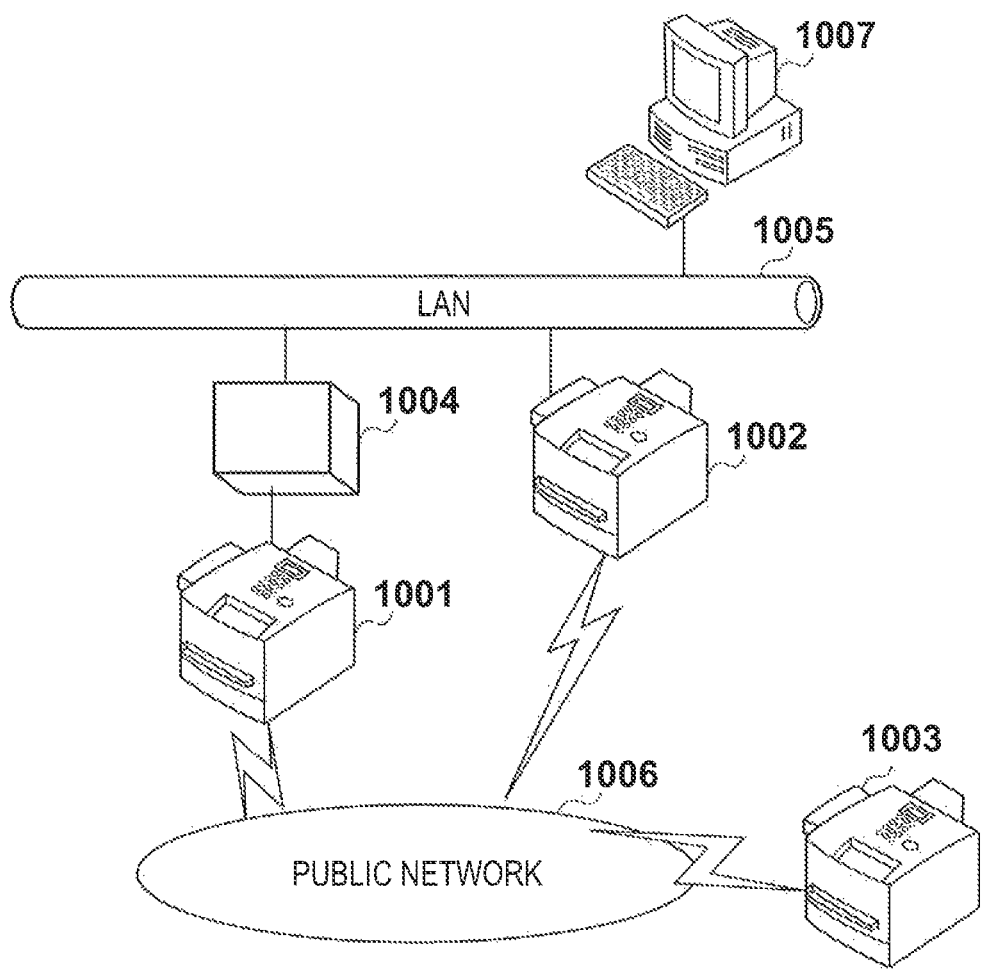
FIG. 1 is a diagram illustrating the configuration of a communication system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. It should be noted that identical structural elements are designated by like reference characters and are not described redundantly.

FIG. 1 is a diagram illustrating the configuration of a communication system that includes a communication apparatus 1001 according to the present invention. An external controller 1004, a communication apparatus 1002 and a personal computer 1007 have been connected to a LAN 1005 so as to be capable of communicating with one another. By way of example, the external controller 1004 is a printer server and the communication apparatus 1002 is multifunction peripheral (MFP). The communication apparatus 1001, communication apparatus 1002 and a communication apparatus 1003 have been connected to a public network 1006 and are arranged so that they are capable of facsimile transmission and reception. Further, the external controller 1004 has been connected to the communication apparatus 1001, and network access from devices on the LAN 1005 to the communication apparatus 1001 is carried out via the external controller 1004.

Figure 2:
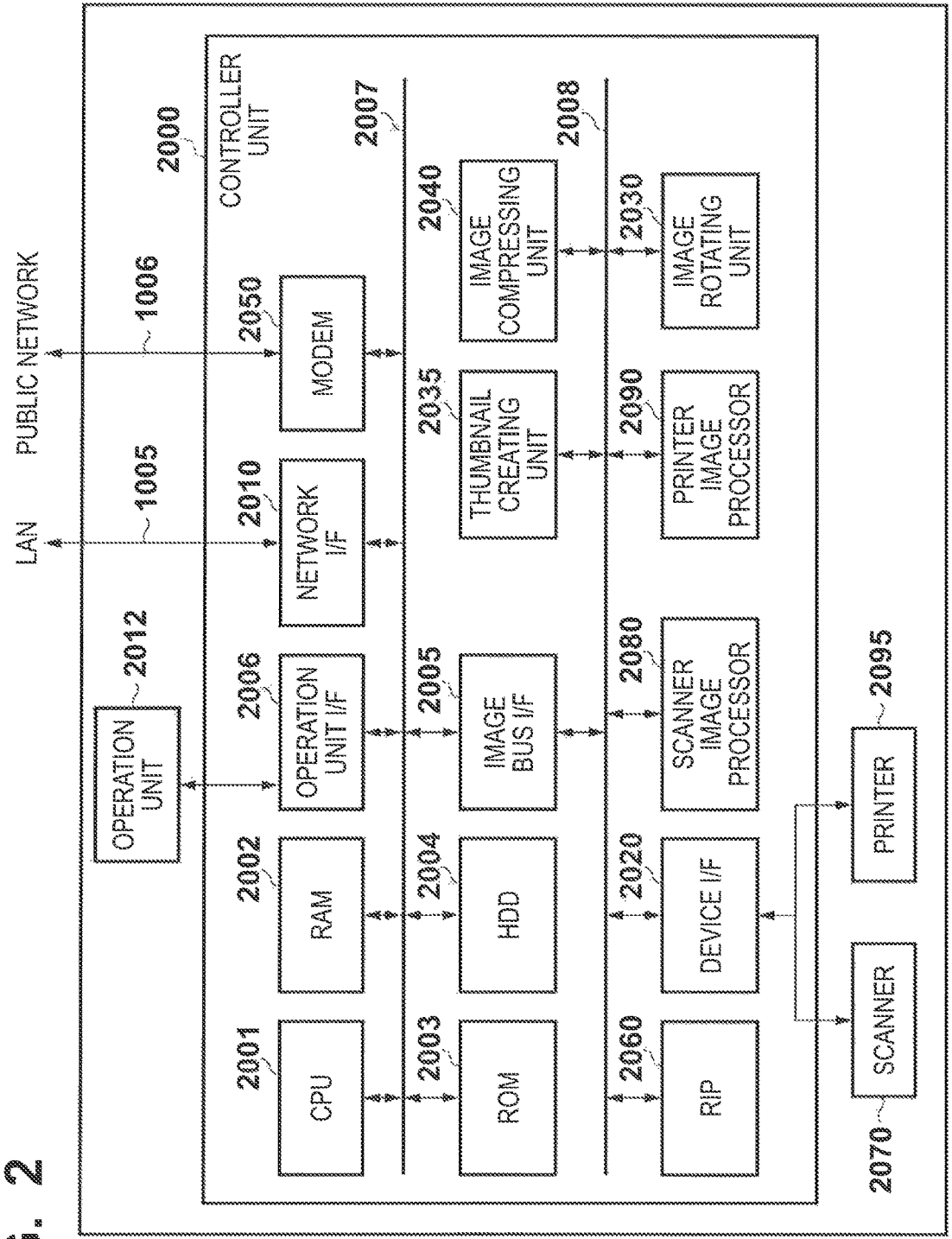
FIG. 2 is a diagram illustrating the hardware configuration of a communication apparatus.

FIG. 2 is a diagram illustrating the hardware configuration of the communication apparatus 1001. A controller unit 2000 is connected to a scanner 2070, which is an image input device, and to a printer 2095, which is an image output device. The controller unit 2000 implements a copy function for printing out an image, which has been read by the scanner 2070, by using the printer 2095. The controller unit 2000 further exercises control so as to input and output image information and device information by being connected to the LAN 1005 or to the public network 1006, such as a WAN.

The controller unit 2000 includes a CPU 2001. The CPU 2001 launches an operating system (OS) using a boot program that has been stored in a ROM 2003. The CPU 2001 subsequently executes various processing by running application programs, which have been stored on a hard-disk drive (HDD) 2004, using the operating system. A RAM 2002 is used as the work area of the CPU 2001. The RAM 2002 provides, in addition to the work area, an image memory area for storing image data temporarily. The HDD 2004 stores image data in addition to the above-mentioned application programs.

The ROM 2003 and RAM 2002 are connected to the CPU 2001 via a system bus 2007. Also connected to the CPU 2001 are a operation unit interface (I/F) 2006, a network I/F 2010, a modem 2050 and an image bus I/F 2005. The operation unit I/F 2006 is for interfacing a operation unit 2012 (console), which has a touch-sensitive panel, and outputs image data to the operation unit 2012 on which the image represented by the image data is displayed. Further, the operation unit I/F 2006 sends the CPU 2001 information that has been input by the user using the operation unit 2012.

The network I/F 2010 is connected to the LAN 1005 and inputs and outputs information to and from other apparatuses via the LAN 1005. The modem 2050 is connected to the public network 1006 and inputs and outputs information to and from other apparatuses via the public network 1006. The image bus I/F 2005 is a bus bridge connected to the system bus 2007 and to an image bus 2008, which transfers image data at high speed, and is for the purpose of converting the structure of the data. The image bus 2008 is constituted by a PCI bus or IEEE 1394. Connected to the image bus 2008 are a raster image processor (RIP) 2060, a device I/F 2020, a scanner image processor 2080, a printer mage processor 2090, am image rotating unit 2030, a thumbnail creating unit 2035 and an image compressing unit 2040.

The RIP 2060 is a processor for expanding PDL code into a bitmap image. The scanner 2070 and printer 2095 are connected to the device I/F 2020, and the device I/F 2020 subjects the image data to synchronous/asynchronous conversion. The scanner image processor 2080 subjects the image data to processing for correcting, manipulating and editing the data. The printer image processor 2090 subjects the print output image data to a printer correction and resolution conversion, etc. The image rotating unit 2030 rotates the image data. The image compressing unit 2040 compresses multivalued image data to JPEG data and also executes expansion processing. The image compressing unit 2040 further compresses binary image data to data in accordance with the JBIG, MMR and MH standards, etc., and also executes expansion processing.

FIG. 3 is a diagram illustrating the main components of the software configuration of the communication apparatus 1001. The communication apparatus 1001 includes a console panel application 3010 for executing processing conforming to the operation performed by the user at the operation unit 2012. The communication apparatus 1001 includes a device control unit 3030 for controlling a facsimile operation implemented by the scanner 2070, printer 2095 and modem 2050, and a management unit 3040 for managing image data and the like stored in a box.

The console panel application 3010 will now be described. A main control unit 3011 controls basic input and output, such as display on a display screen and operation of the touch-sensitive panel by the user. Using the device control unit 3030, a copy operation processor 3012 performs a copy operation for residing an original and copying the original on a recording medium. Using the device control unit 3030 and a document management unit 3050, a scan operation processor 3013 reads an original, converts the original to electronic image data and stores the electronic image data in a document box or transmits the electronic image data to an apparatus on the LAN 1005. Using the device control unit 3030, a transmit operation processor 3014 reads an original and transmits the results to a facsimile machine, email or a file server. Using a destination management unit 3070, the transmit operation processor 3014 processes operations for looking up, creating, deleting and changing a transmission destination. Using the document management unit 3050 and device control unit 3030, a document box operation processor 3015 performs such operations as displaying, printing and transmitting image data that has been stored in a document box. Using an apparatus setting management unit 3090, an apparatus setting processor 3016 processes operations for looking up and changing apparatus settings.

A file converter 3017 executes processing for converting an image file to PDF (Portable Document Format) or XPS (XML Paper Specification) and processing for conversion back to an image file. Here an image file refers to an image file compliant with JPEG, MH, MMR, JBIG and TIFF, etc. Using a user management unit 3060, a user management operation processor 3018 executes user authentication processing and processing such as that for creating and deleting a user. A receive-and-transfer processor 3019 executes transfer processing using the transmit operation processor 3014 if transfer conditions have been satisfied in a case where a facsimile has been received by a facsimile control unit 3034 and in a case where email has been received by a network control unit 3035. Transfer conditions have been registered in a transfer condition management unit 3080. The receive-and-transfer processor 3019 processes operations such as those for creating, deleting and changing transfer conditions in the transfer condition management unit 3080.

In accordance with a file access request from a device connected to the LAN 1005 via the network control unit 3035, a file server processor 3020 executes user authentication processing using the user management unit 3060 and document access processing using the document management unit 3050. At this time the file access request is accepted using SMB/CIFS (referred to simply as "SMB" below) or WebDAV in accordance with a document publication setting that has been set in the apparatus setting management unit 3090. In a case where the document publication setting is "DO NOT PUBLISH", the file access request is not accepted. In a case where the document publication setting is "WebDAV", operation is in accordance with an apparatus configuration setting, which relates to an external controller connection, that has been set in the apparatus setting management unit 3090. In other words, in a case where an external controller has not been connected, a WebDAV service is executed using Port No. 80, which is an ordinary port number for http. If at this time a client issues a file access request using WebDAV, then a port number does not need to be explicitly appended to the address. For example, an address such as "http://hostname/share/folder/" can be used. On the other hand, in a case where an external controller has been connected, a WebDAV service is executed using Port No. 18080, which is an alternative port for http. For example, ":18080" must be appended after the host address in the following manner: "http://hostname:18080/share/folder/". Port No. 18080 is one example of an alternative port; another number is permissible if the number is not one being used by another service.

The device control unit 3030 will be described next. A scanner control unit 3032 controls the scanner 2070, a printer control unit 3033 controls the printer 2095, a facsimile control unit 3034 controls facsimile communication, and the network control unit 3035 controls network communication.

The management unit 3040 will be described next. The document management unit 3050 executes processing such as creation, modification, deletion and viewing of documents comprising image data; creation, modification, deletion and viewing of a folder containing a document; modification of attribute information of documents and folders; change of a setting permitting access to documents and folders; and temporary storage of documents. These items of information are managed in a document database 3051. The user management unit 3060 executes processing such as creation, modification and viewing of user ID, user name, user password, user mail address and user home folder, etc. It also executes user authentication processing in accordance with a request from each unit within the apparatus. These items of information are managed in a user database 3061. The destination management unit 3070 executes processing such as creation, modification, deletion and viewing of destination ID, destination name, destination type and destination address, etc. These items of information are managed in a destination database 3071. Destination ID is an identifying ID issued by the system when a destination is created. Destination name is a character string indicating the destination entered by the user. Destination type is information specifying the access method (communication protocol) used when the destination is accessed. It is set to facsimile, email, SMB or WebDAV, etc. Destination address is set to a facsimile number or email address, or to an SMB shared folder or address of a WebDAV folder. Further, the destination is set also to a user name and password, etc., for accessing the destination using SMB or WebDAV. The transfer condition management unit 3080 manages a transfer condition database 3081 storing a transfer condition list 5000 shown in FIG. 5. The above-mentioned information is managed in the transfer condition database 3081.

Figure 5:
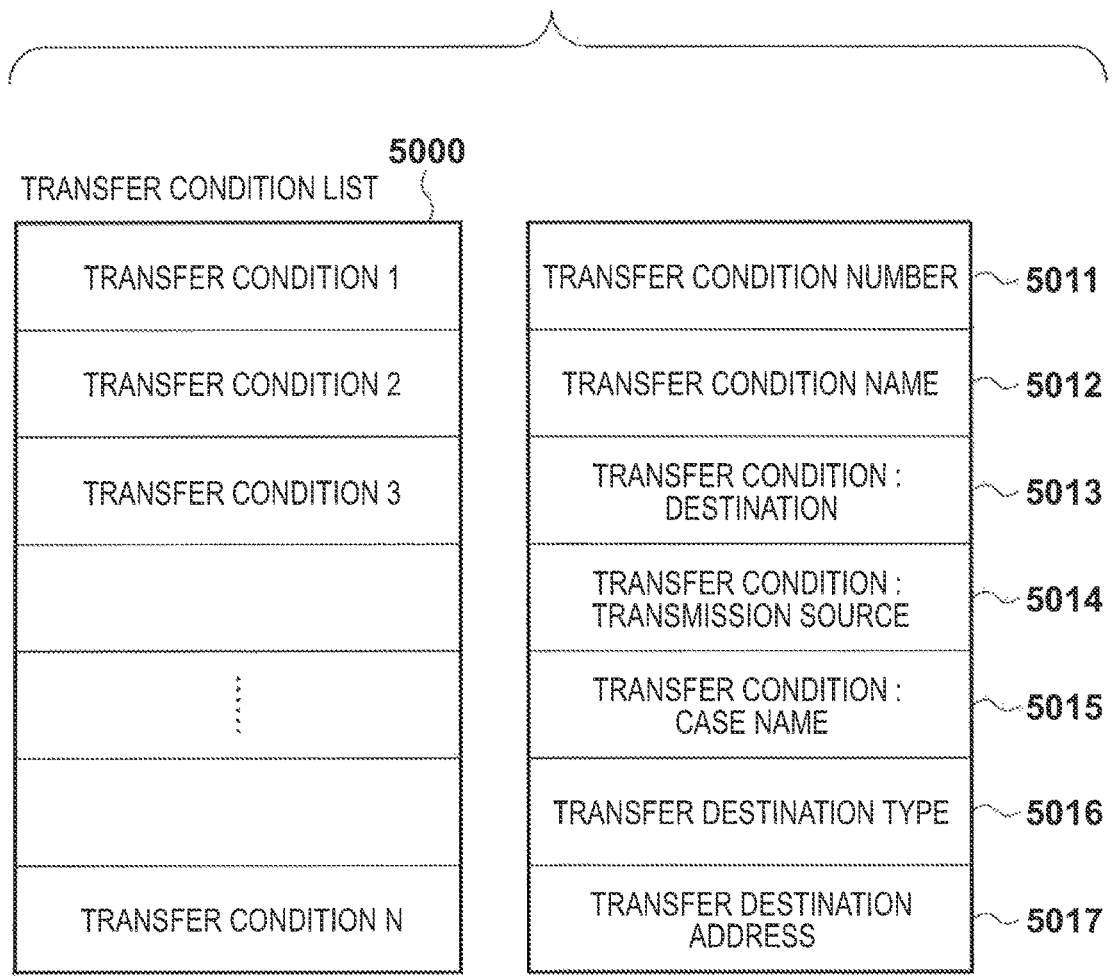
FIG. 5 is a diagram illustrating an example of a transfer condition list.

The transfer condition list 5000 will be described with reference to FIG. 5. For example, in a case where a facsimile has been received at one's own apparatus and, moreover, this data is to be stored in the boxes of remote communication apparatuses, the transfer condition list 5000 will be a list of transfer destinations (addresses, etc., of the remote communication apparatuses) used in such case. The transfer condition list 5000 has been arranged as an array of transfer conditions from a transfer condition 1 to a transfer condition N. Each of these transfer conditions includes transfer condition number 5011, a transfer condition name 5012, a transfer condition: destination 5013, a transfer condition: transmission source 5014, a transfer condition: case name 5015, a transfer destination type 5015, and a transfer destination address 5017.

The transfer condition: destination 5013 is used in a case where a transfer condition such as "IF TELEPHONE NUMBER OF FACSIMILE DESTINATION AGREES WITH NNN-NNNN" is set, by way of example. The transfer condition: transmission source 5014 is used in a case where a transfer condition such as "IF TELEPHONE NUMBER OF FACSIMILE TRANSMISSION SOURCE AGREES WITH NNN-NNNN" or in a case where "IF MAIL ADDRESS OF FACSIMILE TRANSMISSION SOURCE AGREES WITH xxx@xxxx.xxx" is set, by way of example. The transfer condition: case name 5015 is used in a case where a transfer condition such as "IF 'URGENT' IS INCLUDED IN CASE NAME OF EMAIL" is set, by way of example.

Destination table, facsimile, SMB, WebDAV, email and the like can be set in the transfer destination type 5016 as the type of transfer destination. The transfer destination address 5017 holds a destination ID or email address, an address such as that of a shared folder of a file server or the path name of a path to a shared folder, these being managed in the destination database 3071. In case of a destination that requires a user name and password when accessed, as when the destination is a file server, these items of information are also held. If these conditions are satisfied at the time of facsimile reception or the like, transfer processing is applied to the transfer destination being held in the transfer destination address 5017.

By way of example, the transfer condition list 5000 can be set in (imported to) the communication apparatus 1001 via the network control unit 3035 from the personal computer 1007 or communication apparatus 1002 connected to the LAN 1005. This import processing will be described in detail later with reference to FIGS. 4A, 4B and 5.

The apparatus setting management unit 3090 manages the settings necessary for the communication apparatus 1001 to operate. The settings information of the apparatus is managed in an apparatus settings database 3091. A document publication setting and a connection setting relating to an external controller in this embodiment are managed using the apparatus settings database 3091. The document publication setting sets the protocol used by the file server; any of "DO NOT PUBLISH", "SMB" or "WebDAV" can be set. If "DO NOT PUBLISH" has been set, the file server processor 3020 will accept absolutely no file access request via the LAN 1005. If "SMB" has been set, the file server processor 3020 will accept a file access request based upon the SMB/CIFS protocol. If "WebDAV" has been set, the file server processor 3020 will accept a file access request based upon the WebDAV protocol. The external controller connection setting is made "ON" if an external controller has been connected and "OFF" if an external controller has not been connected.

Figure 4A:
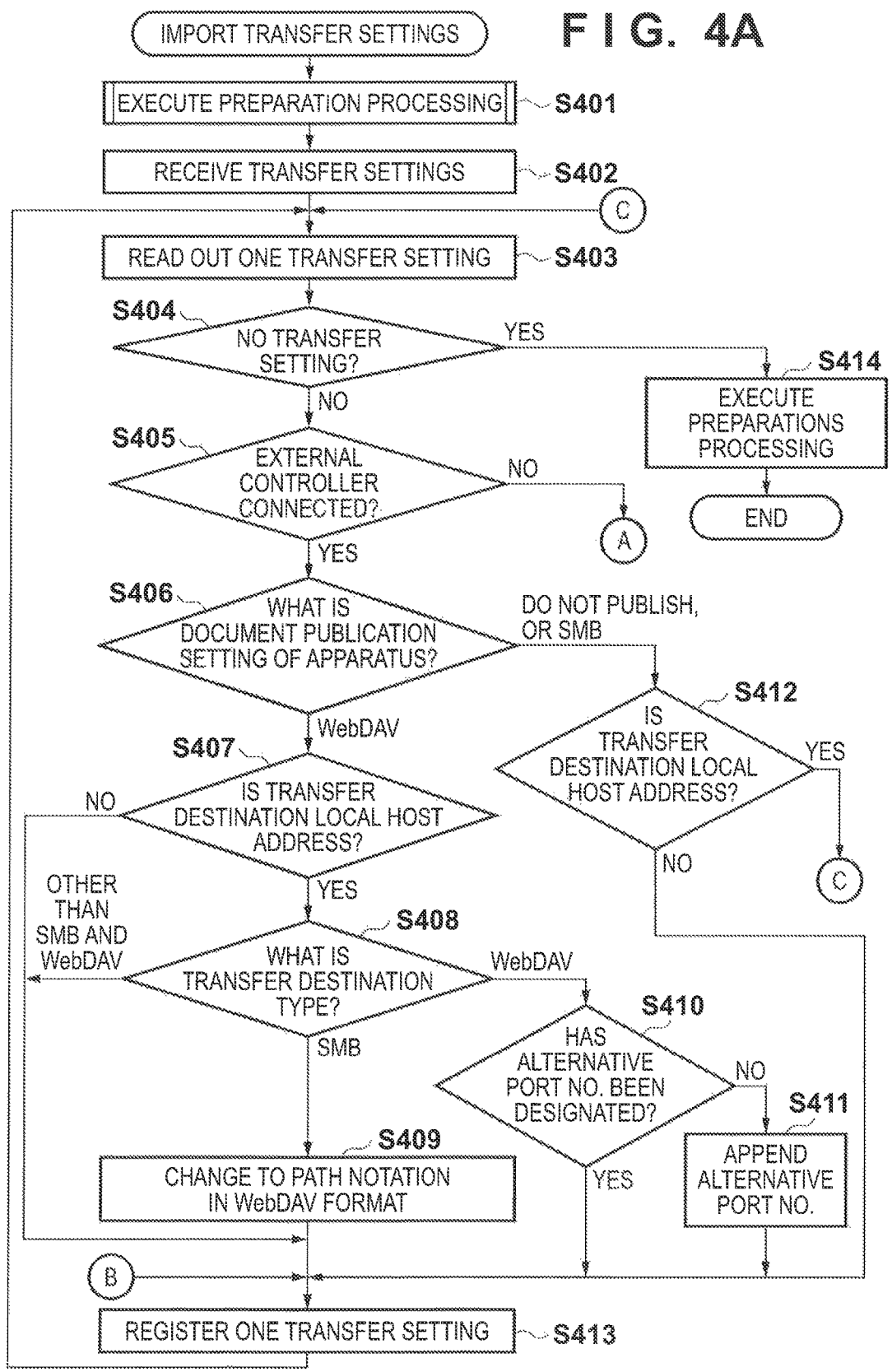
FIG. 4A is a flowchart illustrating the procedure of data control processing in an embodiment of the present invention.
Figure 4B:
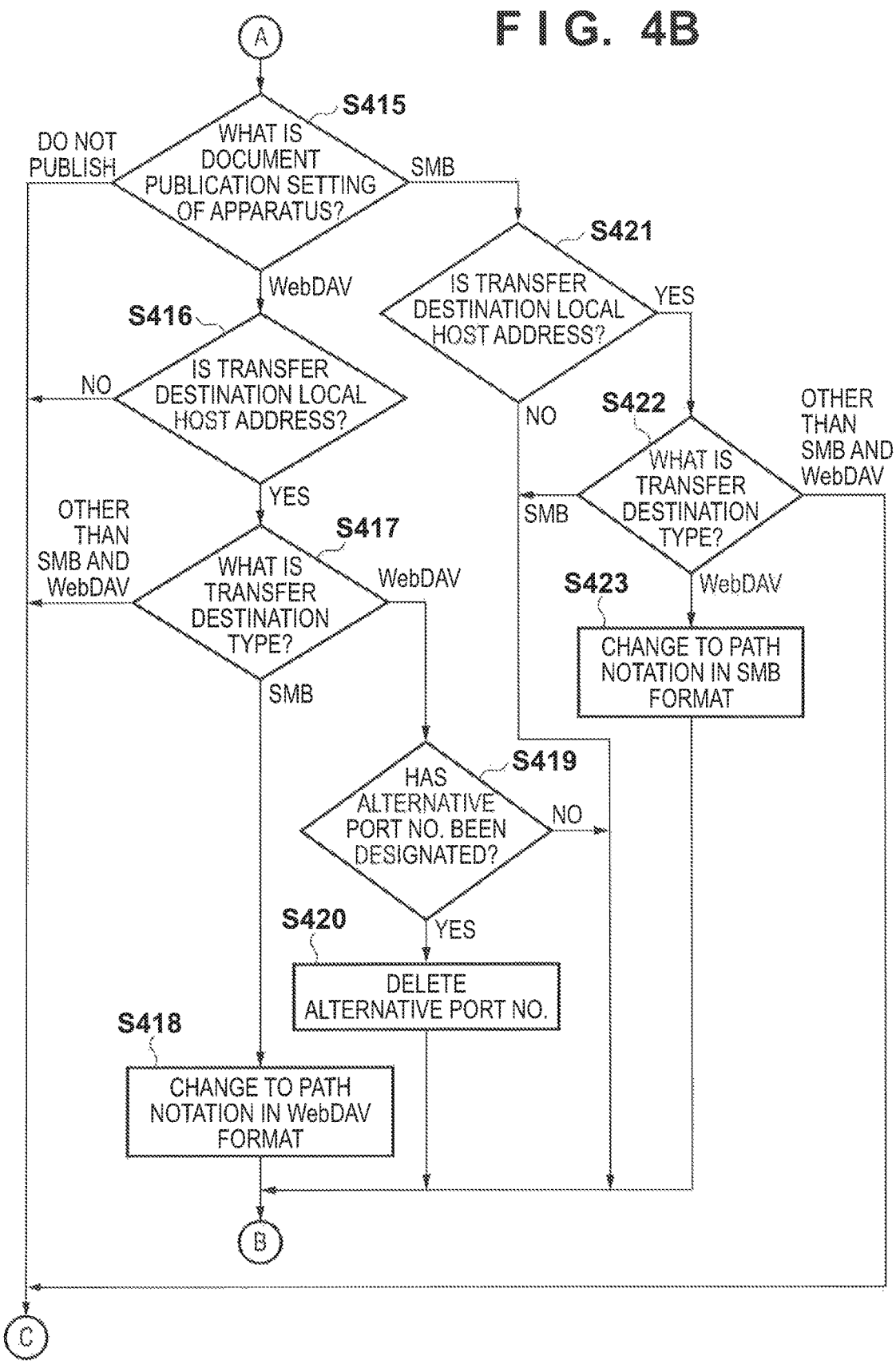
FIG. 4B is a flowchart illustrating a continuation of the processing shown in FIG. 4A.

FIGS. 4A and 4B are flowcharts illustrating the procedure of data control processing in this embodiment. The processing steps shown in FIGS. 4A and 4B are implemented by having the CPU 2001 of communication apparatus 1001 run the program of the receive-and-transfer processor 3019. Further, the processing illustrated in these flowcharts starts in a case where the transfer condition list 5000 is set in the communication apparatus 1001 from the personal computer 1007 or communication apparatus 1002. Specifically, the processing is started by an import instruction from the personal computer 1007 or communication apparatus 1002 on LAN 1005. Upon receiving the transfer-settings import instruction via the network I/F 2010, the CPU 2001 executes initialization processing such as that for acquiring, in RAM 2002, memory for obtaining and storing the transfer condition list 5000 (step S401). Then, the transfer condition list 5000, received via the network I/F 2010, is stored temporarily in the memory acquired (step S402). The transfer condition list 5000 is arranged as the array of transfer conditions 1 to N, as shown in FIG. 5.

Next, the CPU 2001 acquires a variable and reads out one transfer condition to this variable from the RAM 2002 (step S403). Processing then branches at step S404. Specifically, if there is no transfer condition to read out, i.e., if processing regarding all transfer conditions 1 to N is finished, then, at step S414, the CPU 2001 terminates the processing of this flowchart upon executing processing such as that for freeing up memory acquired at step S401. On the other hand, if there is a transfer condition to read out, then processing proceeds to step S405.

At step S405, the CPU 2001 uses the apparatus setting management unit 3090 to determine whether an external controller has been connected. For example, this can be determined depending upon whether the external-controller connection setting is "ON" or "OFF" in the apparatus setting management unit 3090 at step S405. Processing proceeds to step S406 if an external controller is determined to have been connected and to step S415 if an external controller is determined to have not been connected.

At step S406, the CPU 2001 determines the document publication setting of the apparatus using the apparatus setting management unit 3090. Processing proceeds to step S412 if the document publication setting is "DO NOT PUBLISH" or "SMB" and to step S407 if the setting is "WebDAV".

At step S412, the CPU 2001 checks the transfer destination address 5017 that has been set as the transfer condition read out at step S403. If the address of the transfer destination is the local host address, processing for transfer to this transfer destination cannot be executed and control therefore returns to step S403 without the transfer condition being registered in the communication apparatus 1001. On the other hand, if the transfer destination address is not the local host address, then processing proceeds to step S413 and the transfer condition is registered in the transfer condition database 3081 by the transfer condition management unit 3080. The local host address can be ascertained by extracting the network address portion of the destination and determining whether the network address portion of the destination matches the character string below. Specifically, "localhost", "127.0.0.1", "[0:0:0:0:0:0:0:1]", "[0::1]", "[::1]" are used as character strings that represent a local host address.

At step S407, in a manner similar to that at step S412, the CPU 2001 determines whether the transfer destination address 5017 that has been read out is the local host address. Processing proceeds to step S408 if the transfer destination address is the local host address. If the transfer destination address is not the local host address, then processing proceeds to step S413 where the CPU 2001 registers the transfer condition in the transfer condition database 3081 using the transfer condition management unit 3080. At step S408, the CPU 2001 determines the destination type of the transfer destination that has been set as the transfer condition read out at step S403. The destination type is information for identifying the type of protocol used when a transfer is made to the destination. Processing proceeds to step S409 if the destination type is determined to be "SMB", to step S410 if the transfer destination is determined to be "WebDAV" and to step S413 if the destination type is determined to be neither of these.

At step S409, the destination in the SMB format read out at step S403 is changed to the destination in the WebDAV format. For example, "¥¥localhost¥share¥folder" is converted to "http://localhost/share/folder". At step S410, the CPU 2001 checks to see whether a network port number has been designated by the transfer destination that has been set as the transfer condition read out at step S403 and determines whether an alternative port number has been designated. For example, if there is a portion corresponding to ":18080", as in "http://localhost:18080/share/folder", then an alternative port number is determined to have been designated. On the other hand, if there is no portion corresponding to ":18080", then an alternative port number is determined to have not been designated and processing proceeds to step S411. At step S411, "http://localhost/share/folder" is converted to "http://localhost:18080/share/folder", by way of example. Here ":18080" is an example of a network port number for a document publishing service based upon WebDAV in a case where an external controller has been connected to the communication apparatus 1001. It is permissible to use another port number.

Described next will be the case where the determination made at step S405 is that an external controller has not been connected. At step S415, the CPU 2001 determines the document publication setting in a manner similar to that at step S406. If "DO NOT PUBLISH" is determined, then processing returns to step S403 without transfer list registration being carried out. If "SMB" is determined, processing proceeds to step S421, and it "WebDAV" is determined, processing proceeds to step S416. At step S416, the CPU 2001 determines whether the transfer destination address 5017 that has been read out is the local host address in a manner similar to that at step S412. Processing proceeds to step S417 if the address 5017 is determined to be the local host address and returns to step S403 if the address 5017 is not determined to be the local host address. At step S417, the CPU 2001 determines the destination type of the transfer destination in a manner similar to that at step S408. Processing proceeds to step S418 if the destination type is determined to be "SMB" and to step S419 if the transfer destination is determined to be "WebDAV", and returns to step S403 if the destination type is determined to be neither of these. At step S418, the address notation of the SMB format is converted to the address notation of the WebDAV format in a manner similar to that at step S409, and processing then proceeds to step S413. At step S419, the CPU 2001 determines, in a manner similar to that at step S410, whether a network port number (alternative port number) has been designated by the transfer destination that has been set as the transfer condition. If a network port number is determined to have been designated, processing proceeds to step S420, the network port number is deleted and processing proceeds to step S413. If a network port number is determined as not having been designated, processing proceeds to step S413.

At step S421, in a manner similar to that at step S412, the CPU 2001 determines whether the transfer destination address 5017 that has been read out is the local host address. Processing proceeds to step S422 if the transfer destination address is determined to be the local host address and to step S413 if the transfer destination address is determined to not be the local host address. At step S422, the CPU 2001 determines the destination type of the transfer destination in a manner similar to that at step S408. Processing proceeds to step S413 if the destination type is determined to be "SMB" and to step S423 if the transfer destination is determined to be "WebDAV" and returns to step S403 if the destination type is determined to be neither of these. At step S423, the address notation of the transfer destination is converted from the address notation of the WebDAV format to the notation of the SMB format. For example, "http://localhost/share/folder" is converted to "¥localhost¥share¥folder".

In accordance with this embodiment, as described above, in a case where a transfer setting that has been transmitted from another apparatus is received and made the transfer setting of the local apparatus, the setting can be made so as to prevent a transfer error when a data transfer is performed in accordance with this transfer setting. For example, since the contents of a transfer destination contained in a transfer setting can be rewritten based upon the configuration of the local apparatus (i.e., whether or not an external controller has been connected to the local apparatus), a transfer error ascribable to a restriction that is based upon the configuration of the local apparatus can be prevented.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-108735, filed May 13, 2011, which is hereby incorporated by reference herein in its entirety.

What is claimed is:

1. A communicating apparatus comprising:
at least one central processing unit (CPU); and
a memory device storing instructions that, when executed by the at least one CPU, cause the communicating apparatus to:
import a transfer condition which is used by another apparatus for transferring data and a transfer destination address of a first file server in the another apparatus, data received by the another apparatus being transferred to the first file server in the another apparatus in a case where the transfer condition is satisfied in regard to the data received by the another apparatus;
determine whether the communicating apparatus is connected to a network via an external controller or the communicating apparatus is connected to the network not via the external controller;
add, in a case where it is determined that the communicating apparatus is connected to the network via the external controller, a predetermined port number to the imported transfer destination address;
receive data from the network;
transfer, in accordance with a satisfaction of the transfer condition, the received data to a second file server in the communicating apparatus using the imported transfer destination address in a case where it is determined that the communicating apparatus is connected to the network not via the external controller; and
transfer, in accordance with the satisfaction of the transfer condition, the received data to the second file server in the communicating apparatus using an address which is generated by adding the predetermined port number to the imported transfer destination address in a case where it is determined that the communicating apparatus is connected to the network via the external controller.

2. The communicating apparatus according to claim 1, wherein the instructions cause the communicating apparatus to determine whether the predetermined port number has been designated by the imported transfer destination address, and
wherein, in a case where it is determined that the predetermined port number has not been designated by the imported transfer destination address, the predetermined port number is added to the imported transfer destination address.

3. The communicating apparatus according to claim 1, wherein the instructions cause the communicating apparatus to, in a case where it is determined that the communicating apparatus is connected to the network not via the external controller, delete the predetermined port number of the imported transfer destination address.

4. The communicating apparatus according to claim 1, wherein the instructions further cause the communicating apparatus to confirm whether or not the imported transfer destination address is an address of the communicating apparatus, and wherein, in a case where it is confirmed that the imported transfer destination address is not the address of the communicating apparatus, the instructions cause the communicating apparatus not to add the predetermined port number to the imported transfer destination address regardless of a result of determination.

5. The communicating apparatus according to claim 1, wherein the instructions further cause the communicating apparatus to:

set a protocol to be used for accessing the second file server;

specify a protocol, included in the imported transfer condition, to be used for transferring the data; and change, in a case where the set protocol and the specified protocol differ from each other, a notation of the imported transfer destination address to a notation used for the set protocol.

6. The communicating apparatus according to claim 1, wherein the communicating apparatus is a multifunction peripheral including a printing unit, and the external controller is a print server.

7. A method for a communicating apparatus, the method comprising:

importing a transfer condition which is used by another apparatus for transferring data and a transfer destination address of a first file server in the another apparatus, data received by the another apparatus being transferred to the first file server in the another apparatus, in a case where the transfer condition is satisfied in regard to the data received by the another apparatus;

determining whether the communicating apparatus is connected to a network via an external controller or the communicating apparatus is connected to the network not via the external controller;

adding, in a case where it is determined that the communicating apparatus is connected to the network via the external controller, a predetermined port number to the imported transfer destination address;

receiving data from the network;

transferring, in accordance with a satisfaction of the transfer condition, the received data to a second file server in the communicating apparatus using the imported transfer destination address in a case where it is determined that the communicating apparatus is connected to the network not via the external controller; and transferring, in accordance with the satisfaction of the transfer condition, the received data to the second file server in the communicating apparatus using an address which is generated by adding the predetermined port number to the imported transfer destination address in a case where it is determined that the communicating apparatus is connected to the network via the external controller.

8. A non-transitory computer-readable storage medium storing computer-executable instructions which, when executed by a computer, cause the computer to perform a method for a communicating apparatus, the method comprising:

importing a transfer condition which is used by another apparatus for transferring data and a transfer destination address of a first file server in the another apparatus, data received by the another apparatus being transferred to the first file server in the another apparatus in a case where the transfer condition is satisfied in regard to the data received by the another apparatus;

determining whether the communicating apparatus is connected to a network via an external controller or the communicating apparatus is connected to the network not via the external controller;

adding, in a case where it is determined that the communicating apparatus is connected to the network via the external controller, a predetermined port number to the imported transfer destination address;

receiving data from the network;

transferring, in accordance with a satisfaction of the transfer condition, the received data to a second file server in the communicating apparatus using the imported transfer destination address in a case where it is determined that the communicating apparatus is connected to the network not via the external controller; and transferring, in accordance with the satisfaction of the transfer condition, the received data to the second file server in the communicating apparatus using an address which is generated by adding the predetermined port number to the imported transfer destination address in a case where it is determined that the communicating apparatus is connected to the network via the external controller.

9. The communicating apparatus according to claim 1, wherein the predetermined port number added to the imported transfer destination address is an alternative port number for Hypertext Transfer Protocol (HTTP).

10. The communicating apparatus according to claim 1, wherein the instructions further cause the communicating apparatus to add the predetermined port number to the imported transfer destination address by appending a port number after a character of a host address of the imported transfer destination address.

11. The communicating apparatus according to claim 1, wherein, in a case where the communicating apparatus is connected to the network not via the external controller, a first port number for Hypertext Transfer Protocol (HTTP) is used to access the second file server in the communicating apparatus, wherein, in a case where the communicating apparatus is connected to the network via the external controller, a second port number for Hypertext Transfer Protocol (HTTP) is used to access the second file server in the communicating apparatus, and wherein the instructions further cause the communicating apparatus to add, in a case where it is determined that the communicating apparatus is connected to the network via the external controller, the second port number to the imported transfer destination address of the first file server.

* * * * *